April 3, 1934.  H. B. BABSON  1,953,875
COW STANCHION
Filed June 25, 1931
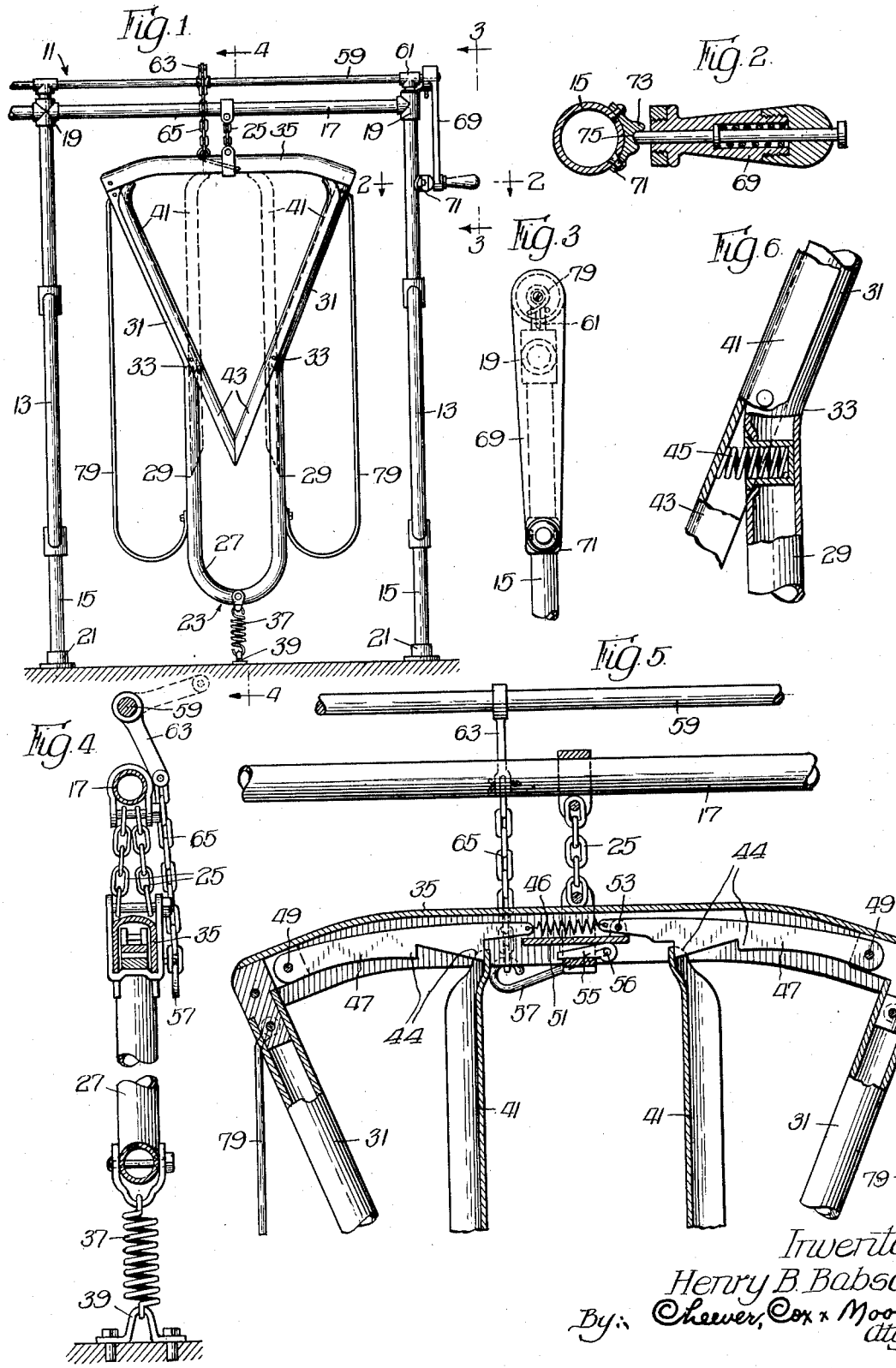
Inventor
Henry B. Babson,
By: Cheever, Cox & Moore
attys Patented Apr. 3, 1934

1,953,875

UNITED STATES PATENT OFFICE 1,953,875

COW STANCHION

Henry B. Babson, Chicago, Ill., assignor to Babson Manufacturing Corporation, Chicago, Ill., a corporation of Illinois Application June 25, 1931, Serial No. 546,798

7 Claims. (Cl. 119—148)

My invention relates in general to animal stalls and has more particular reference to a stanchion for securing a cow or other animal in its stall.

An important object of the invention is to provide a stanchion, in which the energy required for actuating the device is furnished entirely by the animal itself, the attendant being thereby relieved of all duties except to trip a latch or lock when it is desired to release the animal.

Another object is to provide a stanchion which is automatic in the sense that the animal, in entering the stanchion, causes it to close or move to retaining position and, when a latch is tripped by the attendant, the stanchion will, of itself, move to open or releasing position.

Another object of the invention is to provide a stanchion in which the animal may lock itself automatically upon entering the device, the stanchion being provided with means operable in response to the movement of the animal in entering the stanchion to move the device to animal-retaining position.

Another object is to provide a stanchion of simple design, rugged character, and inexpensive construction, positive operation and capable of securely entrapping the animal.

Another object is to provide a gang-control stanchion so constructed that any one of the stanchions may be readily rendered independent of the gang-control mechanism.

Another object of the invention is to provide a simple gang-operating mechanism for tripping a plurality of automatic stanchions in order to condition same to release the animal entrapped therein and the invention further contemplates the provision of means whereby any one or all of the stanchions may be disconnected from the gang-operating mechanism so that individual stanchions may be maintained in animal retaining positions while the remaining stanchions are conditioned to release the animals entrapped therein whereby any members of the herd may be kept in their stalls while the others are released.

Among the other important objects and advantages of the invention is the particular and novel stanchion and automatic construction including the means normally urging the animal-retaining yoke in position permitting the animal to insert its head or other body portion into the yoke and the arrangement whereby the yoke parts are positively moved to animal-retaining position by the natural movements of the animal, whereby a true automatic, self-resetting, animal-retaining mechanism is provided.

Referring to the drawing:

Figure 1 is a fragmentary view of a row of animal stanchions embodying my invention;

Figures 2, 3 and 4 are sectional views taken respectively along the lines 2—2, 3—3 and 4—4 in Figure 1; and Figures 5 and 6 are enlarged views of portions of the apparatus shown in Figure 1, parts of the illustrated portions being broken away to reveal details of construction.

To illustrate my invention, I have shown on the drawing, a portion or section of an animal stanchion 11 providing a row of stalls 12. It will be understood that, if desired, a series of animal stalls similar to that illustrated, may be arranged in adjacent relationship in the stanchion as along the side of a barn or other structure used for housing the animals to be stanchioned.

Each stall is preferably separated from the adjacent stall by means of partitions 13, which may be built into the stanchion structure in any convenient or preferred manner to provide separate stalls in which the animal-retaining mechanism of the stanchion is arranged. In the present instance, the stanchion comprises a frame formed of spaced uprights 15, the upper ends of which are connected by an elongated horizontal support member 17. The frame, of course, may be formed of any suitable material, but I prefer to employ tubular members of wrought iron or other suitable material, which are connected together by means of couplings 19. The uprights may be secured in the floor by means of flanges 21 of common construction and the partition members 13 may consist of bent tubular members fastened on the uprights 15 in any suitable manner to provide individual stalls.

The animal retaining mechanism of the stanchion comprises a yoke 23 in each stall and the yokes are preferably suspended by means of a plurality of spaced suspension members 25, preferably chains, from the horizontal support 17, substantially midway between each adjacent pair of uprights 15.

The yokes 23 form automatic self-locking, animal-entrapping and retaining devices, which are so formed as to normally permit an animal to insert its head or other body portion into the yoke and thereafter to shift portions of the yoke in response to the natural movements of the animal to condition the same to retain the animal, whereby the device is substantially automatic in that the animals themselves provide all the motive force necessary to close the yoke, the parts being automatically latched in closed position and manually operable means being provided to unlatch the devices when it is desired to release the animal, whereupon the yoke parts will be urged to return automatically to a position permitting the animal to escape from the yoke.

To accomplish these and other valuable functions and results, the yoke preferably comprises a symmetrical frame comprising a tubular member 27 of substantially U-shaped configuration, having the lower portions 29 of the arms of the U in substantially parallel, spaced-apart relationship and having upper portions 31 diverging outwardly and upwardly of the parallel portions to provide registering bends in the arms of the U-shaped member 27 at points 33. The upper, outer ends of the diverging portions 31 are connected together by a bowed member 35 comprising a rounded yoke crown and the yoke is supported by connecting the portions 35 to the horizontal member 17 by means of the members 25. The lower end of the U-shaped member 27 also is or may be attached to the floor by a resilient member 37 preferably comprising a spring attached at the bottom of the member 27 and at the other end attached to a staple 39 set in the floor or base on which the structure is erected.

By employing the two suspension members 25, the weight of the yoke, when the same is twisted about a vertical axis, will cause the chains to wind up and impart a torsional urge upon the yoke toward a normal position in the stanchion so that the yoke will always tend to return to and to hang in proper animal-receiving position in the stanchion. If the members are reasonably close together, the effect will not, however, interfere with the turning of the animal's head when stanchioned.

The resilient connection provided by the member 37 also will provide a shock absorbing feature to dampen the jolts naturally imparted to the structure by the entry of a large clumsy animal such as a cow.

Preferably a pair of yoke-opening and closing members 41 are pivoted intermediate their ends on the yoke frame at the points 33, the members being preferably arranged symmetrically one on each side of the member 27. Of course, my invention is not necessarily restricted to the symmetrical arrangement or to two relatively opening and closing members, the same being a preferred construction and the invention contemplating other arrangements as within its scope.

The members 41 have lower portions 43 extending downwardly from the pivot points 33 and the members are preferably formed from sheet metal strips of substantially semi-circular configuration in cross-section so that when the members are swung about their pivots to the vertical position illustrated in dotted lines, the lower portions 43 may snugly embrace and lie against the lower vertical arm portions 29 of the U-shaped member and when the members 41 are rotated to the open position, illustrated in full lines in Figure 1 of the drawing, the upper portion of the members 41 may swingingly embrace the upper diverging portions 31 of the member 27. This is of advantage in that the members 41 may be made of relatively thin flimsy material since they are braced and strengthened by the tubular portion 29 of the yoke frame both when open and when closed.

The members 41 are normally urged to assume the "open" position, illustrated in full lines, by the springs 45, which are mounted in the portion 29 of the U-shaped member 27 and which extend to and engage the lower portion 43 to thereby normally urge same away from the portion 29 to the open position illustrated. When the parts are in the yoke-open position, the arms 41 define a substantially wide V-shaped space into which an animal may insert its head. The animal, in lowering its head after thus inserting it in the V-shaped opening, will press upon the lower portions 43 of the members 41 with its neck. This action will cause the arms to swing about the pivots 33 with their upper ends moving in an inward direction until the yoke-closed position, illustrated in dotted lines, is reached with the lower portions 43 pressed into closing and embracing engagement upon the portion 29 of the member 27. The upper ends of the members 41, during this closing movement, will sweep across under the bowed member 35, and latches 47, comprising levers pivoted at 49 on the member 35, are carried thereby in position to engage the upper ends of the members 41 and latch same in yoke-closing position so that after the animal has forced the members 41 to yoke-closing position, the latches 47 will retain the parts in closed position and the animal will remain with its head entrapped in the yoke until the same is conditioned for releasing the animal.

The latches 47 comprise dogs having preferably two or more latching teeth 44 for engaging the upper ends of the members 41 to latch same in progressively closing positions, the terminal tooth on each latch being that which secures the arms in fully closed position. The inner ends of the latches are or may be connected by means of a spring, the line of action of which is offset above the line of pivot centers 49 and the spring normally urges the latches downwardly toward latching position against the members 41. This effect is also assisted and may, if desired, be accomplished solely by gravity.

The animal-releasing mechanism comprises means to raise the latches 47 about the pivots 49 in order to disengage the upper latched ends of the pivot neck members 41. The latch raising means comprises preferably a member 51 pivoted at 53 on one of the latch members 47 and extending under the free end of the other latch member 47. Beneath the member 51 is arranged a latch lifting finger 55, which is pivoted at 56 to the yoke portion 35, the finger 55 is also provided with a handle 57 for rotating same on the member 35 in order to raise the finger against the plate 51 and thus in turn raise the latch members 47. When it is desired to release the entrapped animal, it is simply necessary to operate the handle 57 in order to raise the latch 47. When this is accomplished, the arms 41 will be released and, as soon as the animal raises its head in the yoke, the springs 45 will rotate the arms to an extent permitting the animal to withdraw its head from between the upper portions of the member 41. The springs 45 need not necessarily be powerful but simply strong enough to impart an opening movement to the members 41 since the arms will fall to open position under the influence of gravity as soon as they are tilted from the vertical yoke-closed position.

It will be noted that the animal retaining yoke, its latching and latch tripping mechanism are all mounted in a single suspended unit and to that extent comprise a self contained unit which can be most cheaply shipped from the factory and most easily installed in any existing stanchion, stall or other frame work simply by suspending the yoke in place and one of the important features of my invention is the provision of a suspensible yoke assembly containing all of the necessary operating elements so that the same can be easily assembled in an existing support structure.

The construction of my present invention lends itself most readily for operation by gang-control means, that is to say, a master control mechanism whereby the latches of a number of yokes may be released simultaneously from a single remote control point. In the illustrated embodiment, I have shown a mechanism for tripping the yoke from a remote control point comprising a shaft 59 rotatably mounted in bearings 61 carried at spaced intervals in the frame, being supported on the member 17, the shaft 69 thus passes above each yoke of the series suspended from the member 17 and the shaft is provided with an arm 63 which is adapted to be raised and lowered when the shaft 69 is rotated in its bearings. The free end of the arm 63 is provided with a flexible member such as a chain 65 adapted for quick detachable connection on the handle 57 of the latch release.

The shaft 59 extends to any suitable remote control point at which it is desired to operate the mechanism and is or may be provided with a handle or crank 69 by which to rotate the shaft in order to trip the latch member of the yoke. Stop means is mounted in the stanchion frame adjacent the handle and in the path of travel, thus to limit the rotation of the shaft. In the embodiment illustrated, the stop means comprises a plate 71 mounted on the end upright 15 of the stanchion frame, the collar being provided with a stop finger 73 extending in the path of rotation of the handle, the plate 71 on one side of the finger 73 is also preferably provided with a perforation or socket 75 to receive a spring-pressed pin carried in the handle, as shown in Figure 2, in order to latch the handle in position against the fingers 73 when at the limit of its movement in one direction. As the handle is turned anti-clockwise in the illustrated embodiment, the member 65 will be raised by the arm 63 and will raise the handle 57 to a position holding the latches 47 out of arm-engaging position so that when the handle is rotated to the position in which the pin 77 is latchingly received in the socket 75, all of the yokes will be conditioned to permit the animal to escape from the stanchion. The handle and shaft 59 are provided with a spring 79 reacting therebetween to urge the handle in a clockwise direction, looking from the right hand end of the shaft 59 in Figure 1, so that as soon as the pin 77 is released from the socket 75, the shaft 59 will unwind and permit the member 65 and the latch 47 to drop, on their own weight, and to thus permit the latches, under the influence of the spring 46, to return to latching position in which the yoke is conditioned for automatic operation whereby the animal will lock itself in the yoke upon entering the stanchion.

Obviously by merely disconnecting the chain 65, any stanchion may be detached from the remote control, latch-releasing mechanism for individual operation.

By suspending the animal retaining yoke from two spaced members 25, the same will be urged to normally assume a predetermined position in the plane of the stanchion frame and, if the suspension members 25 are spaced relatively close together, the construction will permit the animal to move its head freely from side to side when trapped in the stanchion. By providing the resilient connection 37 at the bottom of the stanchion also, the entrapped animal is permitted to move the yoke forwardly and rearwardly in reaching for such food as may be placed for the consumption of the animal behind the stanchion.

These stanchions are particularly well adapted for use with cattle and similar animals which are largely creatures of habit and can easily be taught to lock themselves into the stanchions.

In order to guide the head of the animal into the stanchion and to prevent the animal from inserting its head into the space between the arms of the U-shaped member 27 and the vertical uprights of the support frame, I may arrange curved strips 79 on the frame of the yoke and extending from the lower portions of the member 27 outwardly and upwardly to the upper end of the portions 31 in order to thus fill the space between the yoke frame and the uprights 15 of the stanchion support frame and thus prevent the animal from inserting its head in that space.

I claim:

1. A stanchion comprising a yoke having a rigid frame providing side members, the upper portions whereof extend outward and upward of the lower portions to form a relatively wide opening in the frame through which the animal may insert its head, a supplemental member pivoted to each of said side members near the lower end of the diverging portion thereof, said supplemental members having upper portions adapted to be normally positioned in the frame in relatively wide spacement in the relatively wide opening in the frame and said supplemental members having lower portions extending beyond their pivots into the lower portion of the frame to form therein a substantial V, said lower portions being normally in position to be engaged by the neck of the animal as it lowers its head from the opening, and said upper portions being thereby shifted toward each other into relatively close spacement and means to latch the parts in shifted position.

2. A stanchion comprising a yoke having a rigid frame providing side members, the upper portions whereof extend outward and upward of the lower portions to form a relatively wide opening in the frame through which the animal may insert its head, a supplemental member pivoted to each of said side members near the lower end of the diverging portion thereof, said supplemental members having upper portions adapted to be normally positioned in the frame in relatively wide spacement in the relatively wide opening in the frame and said supplemental members having lower portions extending beyond their pivots into the lower portion of the frame to form therein a substantial V, said lower portions being normally in position to be engaged by the neck of the animal as it lowers its head from the opening, and said upper portions being thereby shifted toward each other, means to latch the parts in shifted position, said side members being cylindrical in cross-section and the supplemental members being concave to closely fit them when in contact therewith.

3. A stanchion having means forming a yoke comprising a frame formed with a narrow frame opening and an adjacent relatively wide opening whereby an animal may insert its head into the wide opening and then move its neck into the narrow opening, members mounted on the frame and extending into the wide opening thereof, resilient means normally urging the members to a position on the yoke permitting insertion of an animal's head into said wide opening, said resilient means being operable by the animal in moving its neck into the narrow opening of the yoke to permit shifting of the members to an obstructing position preventing withdrawal of the animal's head from the wide opening, and means to latch the members in shifted position.

4. A stanchion having means forming a yoke providing side members in closely spaced relation in a part of the yoke and having relatively wide spacement in another portion of the yoke whereby an animal may insert its head between the widely spaced portions and then move its neck between the closely spaced portions, members mounted on the yoke and extending into the widely spaced portions thereof and normally urged to a position therein permitting insertion of the animal's head and operable by the animal in moving its neck into the closely spaced portions of the yoke to shift the members to a position preventing withdrawal of the animal's head between the widely spaced yoke portions, and means to latch the members in shifted position.

5. A stanchion having a yoke comprising a frame having outwardly extending portions providing a substantial yoke opening into which an animal may first insert its head and an adjacent restricted portion into which the animal may then move its neck, shiftable means mounted on the frame and having a portion extending in the yoke opening and into the restricted portion, said means being normally biased toward a position permitting the insertion of the animal's head into the yoke opening but being shiftable against its bias by the movement of the animal's head into the restricted portion of the yoke to animal-retaining position preventing withdrawal of the animal's head, and means to secure the shiftable means in animal retaining position.

6. A stanchion having a yoke comprising a frame having outwardly extending portions providing a substantial yoke opening into which an animal may first insert its head and an adjacent restricted portion into which the animal may then move its neck, shiftable means tiltable about a pivot point on the frame and having portions extending into the yoke opening and into the restricted portion, yielding means normally urging said shiftable means toward a position permitting the insertion of the animal's head into the yoke opening, said yielding means being cooperatively associated with the yoke and the shiftable means on the side of the pivot point opposite from the yoke opening and being caused to yield by the movement of the animal's head into the restricted portion of the yoke to permit the shiftable means to move into position in the yoke opening to prevent the withdrawal of the animal's head, and means to latch the shiftable means in animal retaining position.

7. A stanchion having a yoke comprising a frame providing upwardly and outwardly extending upper portions forming a substantial yoke opening into which an animal may first insert its head and an adjacent restricted portion into which the animal may then move its neck, a member pivoted on the side of the frame approximately at the junction of the yoke opening and the restricted portion, said member having portions extending in the yoke opening and into the restricted portion on opposite sides of the pivot point, a spring carried by the frame and cooperatively associated with the member to normally urge the member on its pivot toward a position in the frame such that one of the portions extends substantially into the restricted yoke opening and another portion of the member toward a position permitting the free insertion of the animal's head into the yoke opening, said spring being caused to yield by the movement of the animal's head from the yoke opening into the restricted portion to permit one of the member portions to assume a position in the yoke opening preventing withdrawal of the animal's head through said opening and thus to retain the animal in the yoke, and means to secure the shiftable member in animal retaining position.

HENRY B. BABSON.